(12) United States Patent
Chopra et al.

(10) Patent No.: US 10,715,435 B2
(45) Date of Patent: Jul. 14, 2020

(54) ROUTING TIER FOR HIGHLY-AVAILABLE APPLICATIONS ON A MULTI-TENANT PLATFORM-AS-A-SERVICE (PAAS) SYSTEM

(71) Applicant: Red Hat, Inc., Raleigh, NC (US)

(72) Inventors: Rajat Chopra, Mountain View, CA (US); Mrunal Patel, Sunnyvale, CA (US); Michael McGrath, Schaumburg, IL (US); Clayton Coleman, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 1450 days.

(21) Appl. No.: 14/248,449

(22) Filed: Apr. 9, 2014

(65) Prior Publication Data

US 2015/0295824 A1    Oct. 15, 2015

(51) Int. Cl.
*H04L 29/08* (2006.01)
*H04L 12/741* (2013.01)
*G06F 9/455* (2018.01)

(52) U.S. Cl.
CPC ........ *H04L 45/745* (2013.01); *G06F 9/45558* (2013.01); *H04L 45/54* (2013.01); *H04L 67/10* (2013.01); *H04L 67/1002* (2013.01); *H04L 67/1006* (2013.01); *H04L 67/1008* (2013.01); *G06F 2009/4557* (2013.01)

(58) Field of Classification Search
CPC ....................................................... H04L 51/12
See application file for complete search history.

(56) References Cited

U.S. PATENT DOCUMENTS

| | | | | |
|---|---|---|---|---|
| 2002/0161917 A1* | 10/2002 | Shapiro | .................. | H04L 45/00 709/238 |
| 2003/0051167 A1* | 3/2003 | King | ...................... | G06F 1/183 726/4 |
| 2003/0093559 A1* | 5/2003 | Ichinohe | ............. | H04L 41/0213 709/239 |
| 2004/0109451 A1* | 6/2004 | Huang | .................... | H04L 45/54 370/392 |
| 2008/0114888 A1* | 5/2008 | Bhatt | .................. | H04L 63/1416 709/231 |
| 2008/0126698 A1* | 5/2008 | Honda | .................. | G06F 3/0607 711/114 |
| 2011/0276695 A1* | 11/2011 | Maldaner | ................ | H04L 41/00 709/226 |

(Continued)

*Primary Examiner* — Yves Dalencourt
*Assistant Examiner* — SM Z Islam
(74) *Attorney, Agent, or Firm* — Womble Bond Dickinson (US) LLP; Daniel E. Ovanezian (57) ABSTRACT

Implementations of a routing tier for highly-available applications on a multi-tenant Platform-as-a-Service (PaaS) system are disclosed. A method of the disclosure includes receiving, from a broker of a multi-tenant PaaS system, information related to a load balancer gear of an application running on the multi-tenant PaaS system. The information includes endpoint information indicating a location of the load balancer gear, and cartridge information identifying one or more cartridges implemented on the load balancer gear. The method further includes updating a routing table in view of the endpoint information and the cartridge information, and causing traffic to be routed to the load balancer gear in view of the updated routing table. The load balancer gear directs traffic to one or more other gears of the application.

10 Claims, 6 Drawing Sheets

(56) References Cited

U.S. PATENT DOCUMENTS

| | | | |
|---|---|---|---|
| 2011/0295984 A1* | 12/2011 | Kunze | G06F 8/62 709/220 |
| 2012/0239825 A1* | 9/2012 | Xia | G06F 9/44505 709/250 |
| 2014/0068611 A1* | 3/2014 | McGrath | G06F 9/45533 718/1 |
| 2014/0130036 A1* | 5/2014 | Gurikar | G06F 8/61 717/176 |
| 2015/0288605 A1* | 10/2015 | Yan | H04L 45/745 370/392 |

* cited by examiner

| Receive, from a broker of a multi-tenant PaaS system, information related to a load balancer gear of an application, in which the information includes endpoint information indicative of a location of the load balancer gear and cartridge information indicative of one or more cartridges implemented on the load balancer gear. |
|---|
| 410 |

| Update a routing table in view of the endpoint information and the cartridge information |
|---|
| 420 |

| Cause traffic to be routed to the load balancer gear in view of the updated routing table |
|---|
| 430 |

ROUTING TIER FOR HIGHLY-AVAILABLE APPLICATIONS ON A MULTI-TENANT PLATFORM-AS-A-SERVICE (PAAS) SYSTEM

TECHNICAL FIELD

The implementations of the disclosure relate generally to computing infrastructures and, more specifically, relate to a routing tier for highly-available applications on a multi-tenant Platform-as-a-Service (PaaS) system.

BACKGROUND

Currently, a variety of Platform-as-a-Service (PaaS) offerings exist that include software and/or hardware facilities for facilitating the execution of web applications. In some cases, these PaaS offerings utilize a cloud computing environment (the "cloud") to support execution of the web applications. Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications that are entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide a routing tier for highly-available applications on a multi-tenant Platform-as-a-Service (PaaS) system. In one implementation, a routing tier (which may also be referred to as a "routing component" herein) routes traffic (e.g., requests from client devices to access application data) to one or more load balancer gears of the multi-tenant PaaS, which in turn allocates the traffic to a plurality of gears of an application. A gear of an application is a resource-constrained processing space of a node (e.g., virtual machine (VM)) of the multi-tenant PaaS system that provides functionality to support execution of the application. Applications typically utilize multiple gears, which are implemented on one or more node (e.g., VMs).

The routing component receives information related to a new load balancer gear that is to be utilized by the application. For example, the information may come from a broker of the PaaS system that created the load balancer gear, from the newly-created load balancer gear, or from both. The routing component then updates a routing table (which serves as a mapping between application Domain Name Service (DNS) entries, load balancer gears, and backend gears that receive application traffic) in view of the received information. With this information, the routing component is able to route traffic to the new load balancer gear and any previously-utilized load balancer gears, which together balance the traffic load across the plurality of gears utilized by the application.

In creating the new load balancer gear, the broker may receive instructions to create a new load balancer gear, or may determine that, based on an application policy, a new load balancer gear is to be utilized by the application. The broker then facilitates the creation of the new load balancer gear, stores relevant information related to the new load balancer gear (such as endpoint and cartridge information discussed further below), and transmits information to the routing component to make the routing layer aware of the newly-created load balancer gear.

Previous implementations of multi-tenant PaaS systems utilized a single instance of a load balancer gear to route traffic to the other gears of an application. However, if the load balancer gear and/or the node it resides on fails, traffic directed to the application would be prevented from reaching the application. Implementations of the disclosure utilize a routing tier in communication with multiple load balancer gears that each cooperate to effectively distribute traffic such that, if a single load balancer gear fails, traffic can still be routed to the application while problems with individual gears can be corrected. In addition, this infrastructure is scalable and can intelligently-allocate new load balancer gears to accommodate higher traffic loads for an application of the multi-tenant PaaS.

Figure 1:
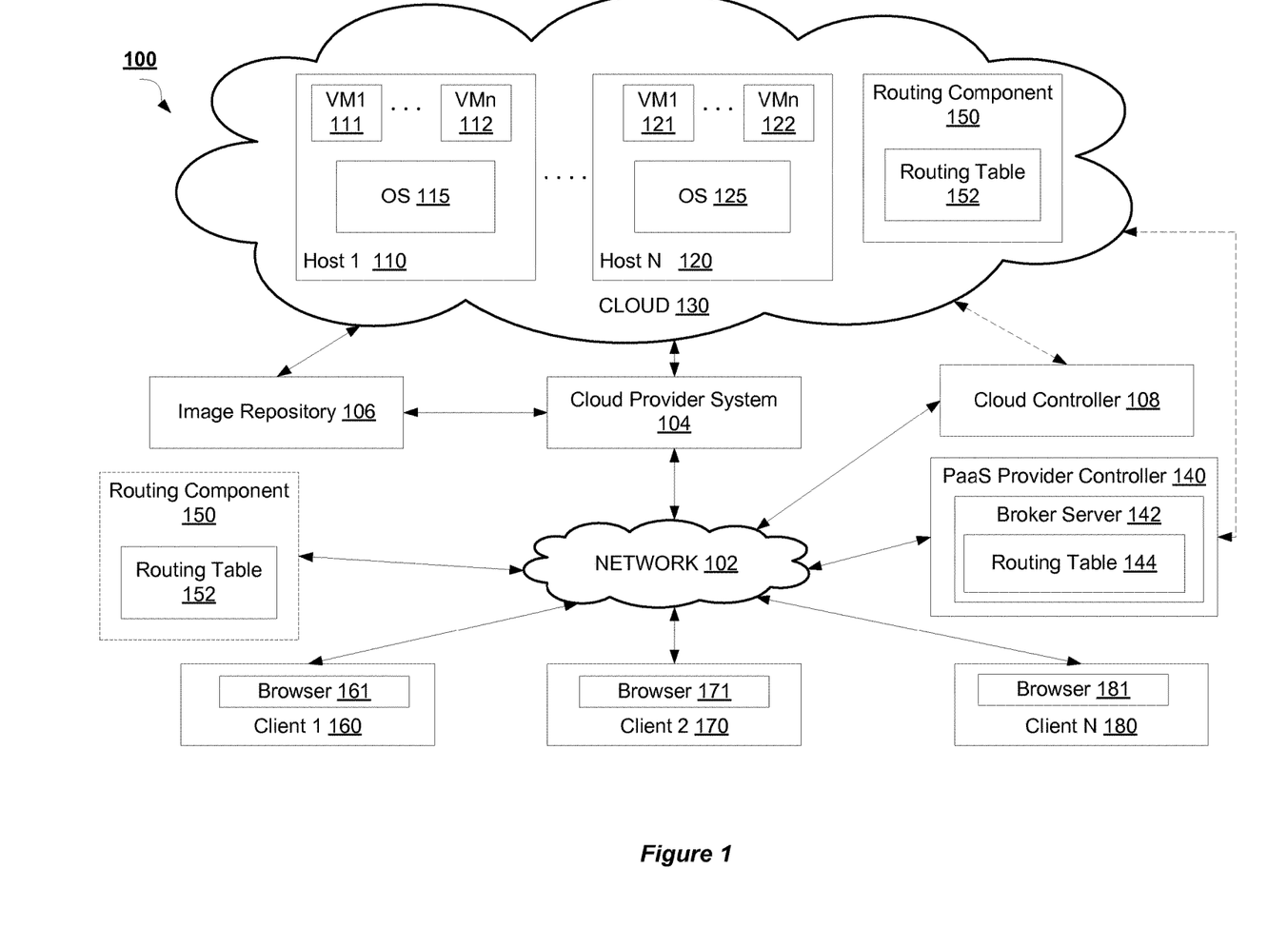
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. The VMs 111, 112, 121, 122 may be executed by OSes 115, 125 on each host machine 110, 120.

In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181. In other implementations, the applications may be hosted directly on hosts 1 through N 110-120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from a PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, or in an image repository (not shown) located on each host 110, 120, or in an image repository (not shown) located on each VM 111, 112, 121, 122. This data may be used for the execution of applications for a multi-tenant PaaS system managed by the PaaS provider controller 140.

Routing component 150 may be a component of the multi-tenant PaaS system managed by PaaS provider controller 140. The routing component may be a hosted by cloud 130. For example, routing component 150 may be hosted on any of host machines 110, 120, or may be hosted separately. In some implementations, routing component 150 may optionally be implemented outside of cloud 130 and hosted on a routing server connected to network 102, or implemented on a client device, such as clients 160, 170, and 180 (not shown). Routing component 150 includes routing table 152, which contains information relating to gears (which are containers of sets of resources utilized by an application), running on VMs 111, 112, 121, 122, or any combination thereof, corresponding to a multi-tenant PaaS application (discussed below).

Specifically, routing table 152 may contain endpoint information for each of the gears. Endpoint information describes a location of a gear and/or a role of the gear, and may include one or more of an endpoint DNS entry of the gear, a port number, a hostname of a host server of the gear, a role of the gear (e.g., how the gear is to be utilized by the application), a protocol (e.g., Hypertext Transfer Protocol (HTTP), Hypertext Transfer Protocol Secure (HTTPS), Transmission Control Protocol (TCP), Git, Secure Shell (SSH), or a MySQL protocol), or information related to endpoints of other gears (e.g., locations of other gears to which traffic is to be routed). The endpoint information is utilized by routing component 150 to route traffic through load balancer gears to other gears utilized by the application. Further details of routing component 150 and its interactions with multiple load balancer gears in a multi-tenant PaaS system are described below with respect to FIG. 3.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
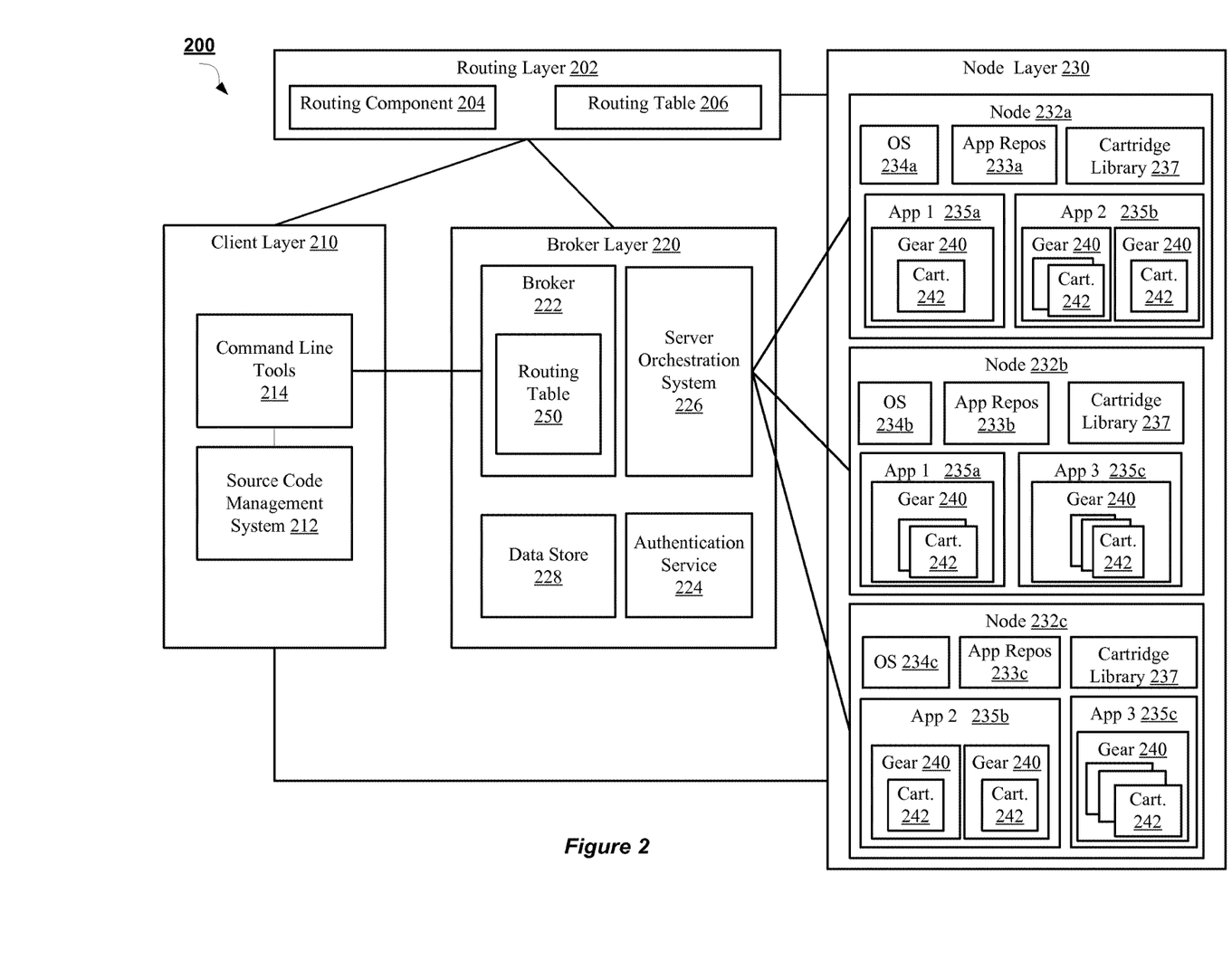
FIG. 2 is a block diagram of a Platform-as-a-Service (PaaS) system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a routing layer 202, a client layer 210, a broker layer 220, and a node layer 230.

In one implementation, the routing layer 202 is distributed among a set of servers configured to provide highly available routing and/or load balancing for a set of applications. In some implementations, multiple routers may exist on a single server, or may be distributed among the set of servers.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Another example of an SCM or revision control system is Debian, also available as open source software. Git, Debian, and other such distributed SCM systems typically include a working directory for making changes, and a local software repository for storing the changes for each application associated with the end user of the PaaS system 200. The packaged software application can then be "pushed" from the local SCM repository to a remote SCM repository, such as app repos 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command tools 214 that a user can utilize to create, launch, and manage applications. In one implementation, the command tools 214 can be downloaded and installed on the user's client machine, and can be accessed via a command line interface or a graphical user interface, or some other type of interface. In one implementation, the command tools 214 expose an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232a-c on which software applications 235a-c are provisioned and executed. In one implementation, each node 232a-c is a VM provisioned by an Infrastructure-as-a-Service (IaaS) provider. In other implementations, the nodes 232a-c may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command tools 214 at client layer 210, requests the creation of a new application 235a-c, or some other action to manage the application 235a-c, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232a-c. The client layer 210 may allow the user to transmit instructions to create or remove gears implemented by an application of PaaS system 200, and specify how these gears are to be used (e.g., as load balancer gears). The client layer 210 also allows for policies to be set by the user to indicate when new gears are to be created and how they are to be used, which may be stored as part of routing table 250 of broker 222, as discussed further below.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the broker 222 manages the business logic and model representing the nodes 232a-c and the applications 235a-c residing on the nodes, and acts as a controller that generates the actions requested by users via an API of the client command tools 214. The server orchestration system 226 then takes the actions generated by the broker 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232a-c and their applications 235a-c to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some implementations, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple cartridges that may be utilized by applications 235a-c deployed on node 232a-c. A cartridge can represent a form of support software (or middleware) providing the functionality, such as configuration templates, scripts, dependencies, etc., to run an application 235a-c and/or add a feature to an application, 235a-c. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance 242 of a cartridge from cartridge library 237 to an application 235a-c provides a capability for the application 235a-c, without the customer who owns the application having to administer or update the included capability.

In one implementation, each node 232a-c is implemented as a VM and has an operating system 234a-c that can execute applications 235a-c using the app repos 233a-c and cartridge libraries 237 that are resident on the nodes 232a-c. Each node 302a-b also includes a server orchestration system agent (not shown) configured to track and collect information about the node 232a-c and to perform management actions on the node 232a-c. Thus, in one implementation, using MCollective™ as the server orchestration system 226, the server orchestration system agent at the node 232a-c can act as a MCollective™ server. The server orchestration system 226 would then act as the MCollective™ client that can send requests, queries, and commands to the MCollective™ server agent on node 232a-c.

As previously mentioned, cartridges provide the underlying support software that implements the functionality of applications 235a-c. In one implementation, an application 235a-c may utilize one or more cartridge instances 242 that are run in one or more resource-constrained gears 240 on nodes 232a-c. Cartridge library 237 provides an OS-based location, outside of all application gears 240, that acts as a source for cartridge instantiations 242 that provide functionality for an application 235a-c.

An application 235a-c may use more than one cartridge instance 240 as part of providing functionality for the application 235a-b. One example of this is a JavaEE application that uses a JBoss™ AS7 cartridge with a supporting MySQL™ database provided by a MySQL™ cartridge. Each cartridge instance 242 may include a software repository that provides the particular functionality of the cartridge instance 242.

As mentioned above, a gear 240 is a resource-constrained process space on the node 232a-c to execute functionality of an application 235a-c. In some implementations, a gear 240 is established by the node 232a-c with resource boundaries, including a limit and/or designation of the amount of memory, amount of storage, and security types and/or labels to be applied to any functions executed by the gear 240. In one implementation, gears 240 may be established using the Linux Containers (LXC) virtualization method. In further implementations, gears 240 may also be established using cgroups, SELinux™, and kernel namespaces, to name a few examples. As illustrated in FIG. 2, cartridges instances 242 for an application 235a-c may execute in gears 240 dispersed over more than one node 232a-b. In other implementations, cartridge instances 242 for an application 235a-c may run in one or more gears 240 on the same node 232a-c.

Implementations of the disclosure utilize a routing layer 202 and multiple load balancer gears 240 to route traffic (e.g., requests from client devices to access an application) to each of a plurality of gears 240 of an application 235a-c of the multi-tenant PaaS system. Routing layer 202 may be implemented on a single server, implemented across multiple servers, or across multiple hosts of a cloud platform (e.g., host machines 110, 120 of cloud 130). Routing layer 202 may be implemented by hardware or may be implemented in software (e.g., on virtual machines such as VMs 111, 112, 121, 122). In some implementations, routing layer 202 may be implemented on a server that the broker 222 is implemented on, on a client device (e.g., clients 160, 170, 180) of client layer 210, or within node layer 230 on nodes 232a-232c.

In one implementation, routing layer 202 receives, from broker layer 220, information related to a load balancer gear 240 of an application 235a-c. The information may include endpoint information, which describes a location of the load balancer gear 240 and/or a role of the load balancer gear 240, and may include one or more of an endpoint DNS entry of the load balancer gear 240, a port number, a hostname of a host server of the load balancer gear 240 (e.g., host 110 of cloud 130), a role of the load balancer gear 240 (e.g., distributing traffic to other gears), a protocol (e.g., HTTP, HTTPS, TCP, Git, SSH, or MySQL), or information related to endpoints of other gears (e.g., locations of other gears to which traffic is to be routed). The information also includes information related to cartridges 242 supported by the load balancer gear 240.

In one implementation, the load balancer gear information is initially stored in routing table 250 of broker 222, and is then transmitted to routing component 204. Routing table 206 of routing layer 202 is updated to include the received load balancer gear information. Updated routing table 206 is then utilized by routing component 204 to route traffic for an application 235a-c through a corresponding load balancer gear 240 for the application 235a-c, as well as through one or more previously-utilized load balancer gears 240 corresponding to the application 235a-c.

Routing component 204 and routing table 206 may be the same as routing component 150 and routing table 152, respectively, described with respect to FIG. 1. Broker 222 and routing table 250 may be the same as broker server 142 and routing table 144, respectively, described with respect to FIG. 1. Further details on the load balancer gear 240 and routing component 204 are described below with respect to FIG. 3.

Routing table 250 may include information related to all gears 240 utilized by an application 235a-c of the user, including endpoint information of the gears 240, how these gears 240 are to be utilized, and software components (referred to herein as cartridges) associated with each gear 240. For example, web load balancer gears may have one or more cartridges 242 configured to balance the load at or above the node level and route traffic directly to other gears on their respective nodes, or gears residing on different nodes. For example, one cartridge 242 of a load balancer gear 240 may be a HAProxy cartridge for facilitating load balancing.

Figure 3:
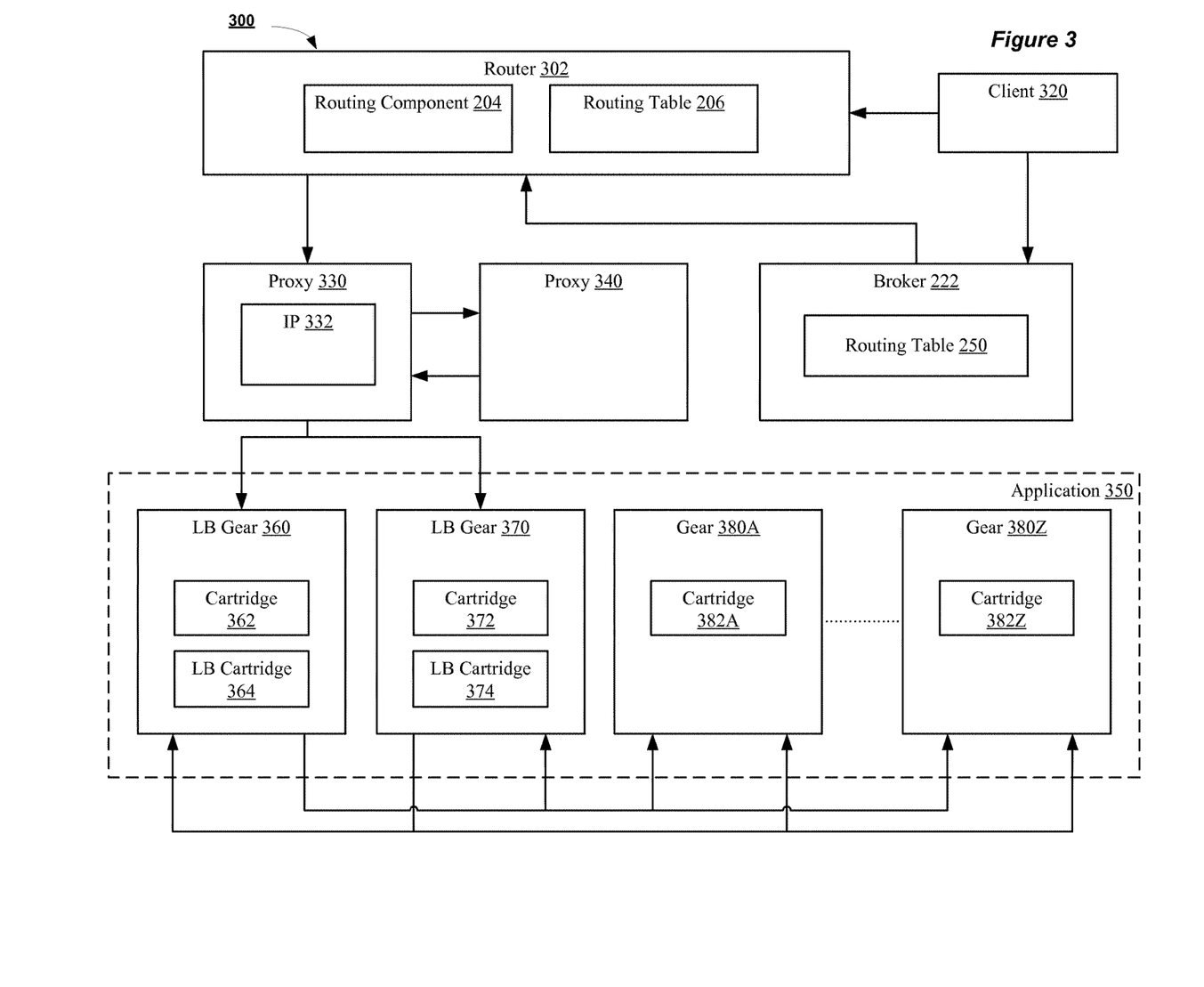
FIG. 3 is a block diagram of a communication architecture of a multi-tenant PaaS for a routing tier that routes traffic through multiple load balancer gears in a multi-tenant PaaS system according to an implementation of the disclosure.

FIG. 3 is a block diagram of a communication architecture of a multi-tenant PaaS for a routing tier that routes traffic through multiple load balancer gears in a multi-tenant PaaS system according to an implementation of the disclosure. Architecture 300 includes the broker 222 in communication with a router 302 and application 350 (which includes gears 360, 370, and 380 distributed across one or more nodes). Broker 222 and its routing table 250 may be the same as their counterparts described with respect to FIG. 2.

In one implementation, the broker 222 utilizes routing table 250 to assist in managing creation, deletion, and management of gears utilized by application 350. In some implementations, broker 222 receives instructions directly from client device 320. For example, a user, such as an owner of an application 350, at client device 320 may instruct broker 222 to create an additional gear or load balancer gear for the application to accommodate high traffic demands for the application. In some implementations, an application 350 may be created with a single load balancer gear 360 as a default configuration, and then the broker 222 may create additional load balancer gears 370 upon receiving an instruction from client device 320, or based on an application policy. The application owner may choose to return to a single load balancer gear configuration at any time, and broker 222 may accordingly either remove the additional load balancer gear(s) 370 from the application or "demote" (convert) the additional load balancer gear(s) 370 to a backend gear (e.g., a gear that contains software resources utilized by the application but does not load balance for the application).

Router 302 includes routing component 204 and routing table 206, which may be the same as their counterparts described with respect to FIG. 2. Router 302 may part of a routing layer (e.g., routing layer 202) and be implemented on a single server, implemented across multiple servers, or across multiple hosts of a cloud platform (e.g., host machines 110, 120 of cloud 130). Routing layer 202 may be implemented by hardware or may be implemented in software (e.g., on virtual machines such as VMs 111, 112, 121, 122). In some implementations, router 302 may be implemented on a server that the broker 222 is implemented on, on client device 320, or implemented by any of the nodes occupied by gears 360, 370, 380A-Z. Router 302 may receive indications and information from broker 222 related to the creation of new gears and store this information in routing table 206. In some implementations, router 302 may receive the information from client device 320, or even directly from a newly created gear. Routing component 204 utilizes the information maintained in routing table 206 to route traffic to load balancer gears of application 350. Routing table 206 serves as a mapping between application DNS entries, load balancer gears, and backend gears that receive application traffic.

In some implementations, traffic routing is performed using a heartbeat Internet Protocol (IP) failover configuration, which bridges router 302 to load balancing gears 360, 370. Proxy 330 and proxy 340 may be configured as hosts to route requests (e.g., HTTP requests) to load balancer gears 360 and 370 within application 350. In one implementation, proxies 330, 340 are servers utilized by the application, which may be requisitioned by the broker 222 when the application is created. In some implementations, the proxies may be implemented by virtual machines distributed across host devices in a cloud (e.g., hosts 110, 120 in cloud 130), or implemented by client devices (for example, proxy 330 may be implemented by client 320). In this configuration, IP address 332 is assigned to proxy 330, and may have been originally assigned to proxy 330 by the broker 222 at the creation of the application, or may be an IP address of client device 320). IP address 332 may be assigned to proxy 330 as long as proxy 330 is capable of handling traffic. If proxy 340 detects that proxy 330 is not responding, IP address 340 may be assigned to proxy 340 and traffic may be routed through proxy 340.

Load balancer gears 360 and 370 (also referred to as "head gears") are gears to which application traffic is routed by routing component 204. Load balancer gears 360 and 370 may exist on the same node, or on different nodes, in order to prevent application downtime in the event of node failure. Load balancer gears 360 and 370 include load balancer cartridges 364 and 374, respectively, that each may be, for example, HAProxy cartridges that identify a node that a DNS entry of the application points to and facilitate traffic distribution to backend gears of the application. In certain implementations, load balancer gears 360 and 370 may also include non-load balancing functionality cartridges, such as cartridges 362 and 372, respectively. Cartridges 362, 372 may provide a web framework, (e.g., a PHP framework), a database framework, or other functionality for the application 350, thus allowing the load balancer gears to also serve a dual function as backend gears. The cartridge capabilities of each load balancer gear 360, 370 may be stored in both routing table 250 of broker 222 and routing table 206 of router 302.

Gears 380A-Z are backend gears to which application traffic may be ultimately routed. Gears 380A-Z are depicted as being equipped with single cartridges 382A-Z, respectively, though each gear 380A-Z may be equipped with one or more available cartridges from the cartridge libraries of the respective nodes on which gears 380A-Z reside. Load balancer gears 360 and 370 both route traffic to each of gears 380A-Z.

Cartridges 382A-Z may each utilize different protocols (e.g., HTTP, CTP, WS, WSS, and TCP). In such implementations, more effective load balancing may be achieved by separately distributing the application traffic load in view of the particular cartridge types on the end point gears. Specifically, each of load balancer gears 360 and 370 may route traffic to subsets of the total collection of backend gears. For example, suppose gear 380A represents a first subset of gears utilizing cartridge 382A (using a first protocol) and gear 380Z represents a second subset of gears utilizing cartridge 382Z (using a second protocol). In this scenario, load balancer gear 362 may route traffic exclusively to gear subset 380A and load balancer gear 370 may route traffic exclusively to gear subset 380Z. In some implementations, backend gears may include multiple cartridges, and thus overlap may exist between the subsets in accordance with the aforementioned scenario. It is noted that in such implementations, if one load balancer gear fails (e.g., load balancer gear 360), some gears may become unreachable (e.g., gear subset 380A). Accordingly, in some implementations, broker 222 may determine that additional load balancer gears are to be created to balance the load to identical subsets of backend gears.

Figure 4:
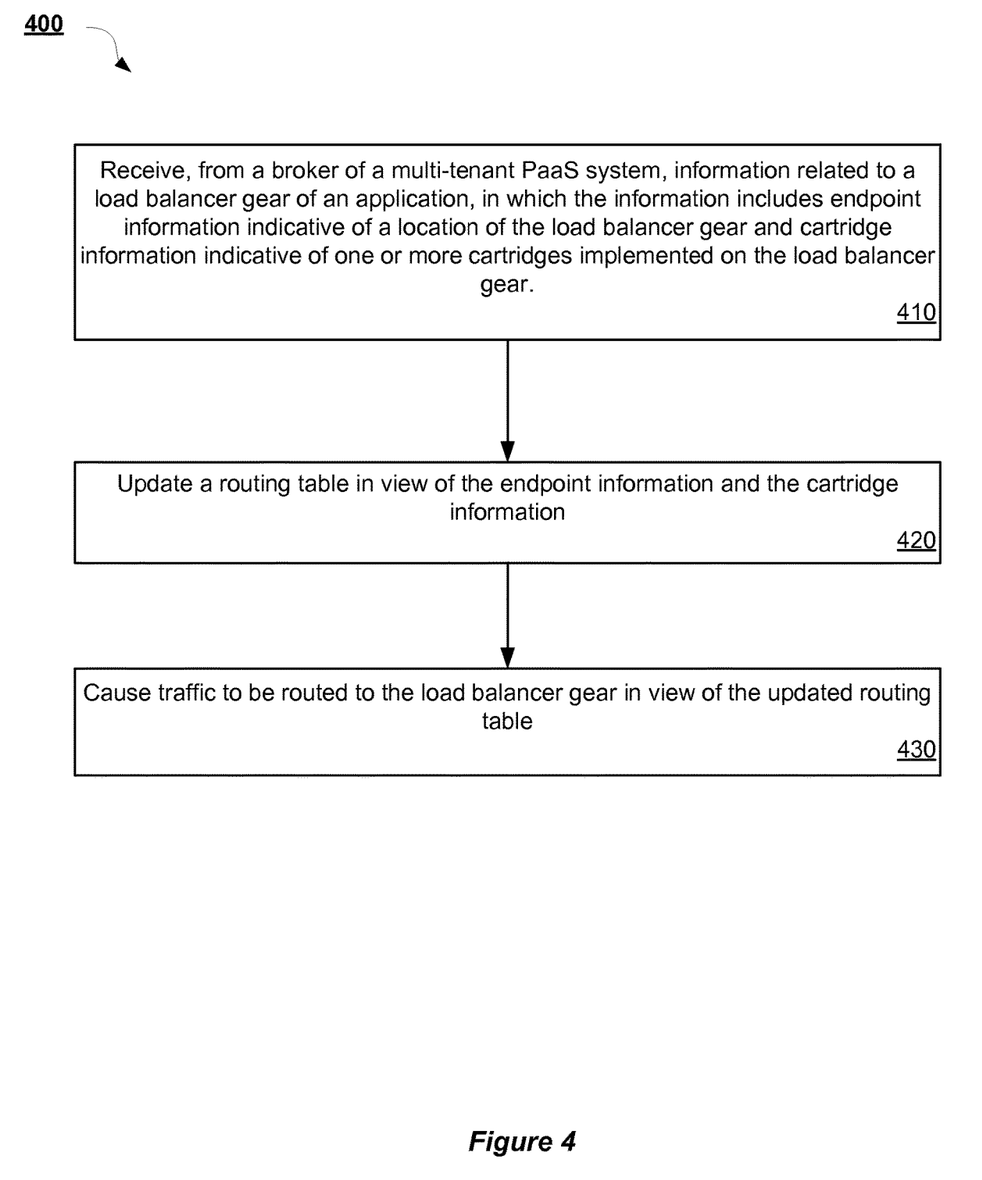
FIG. 4 is a flow diagram illustrating a method for routing traffic in a multi-tenant PaaS system according to an implementation of the disclosure.

FIG. 4 is a flow diagram illustrating a method for routing traffic in a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by routing component 204 described with respect to FIGS. 2 and 3. In other implementations, method 400 is performed by broker 222 (e.g., when broker 222 acts as router 302).

Method 400 begins at block 410, where a routing component (e.g., routing component 204) receives information relating to a load balancer gear of an application. In one implementation, the information is received from a broker (e.g., broker 222) of a multi-tenant PaaS system. The information includes endpoint information indicative of a location of the load balancer gear (e.g., DNS entry information) and cartridge information indicative of one or more cartridges implemented on the load balancer gear. For example, the cartridge information indicates software components installed on the load balancer gear. At block 420, the routing component updates a routing table (e.g., routing table 206) to include the received endpoint and cartridge information. This information may be identical or substantially identical to information maintained in a separate routing table at the broker (e.g., routing table 250). In some implementations, the broker transmits its updated routing table information to the routing table associated with the routing component.

At block 430, the routing component causes traffic to be routed to the load balancer gear in view of the updated routing table. For example, the endpoint information associated with the load balancer gear indicates to the routing component that traffic is to be routed directly to the load balancer gear, which in turn routes traffic to backend gears of an application. In some implementations, one or more load balancer gears are previously utilized by the application. For example, the load balancer gear may have previously routed traffic to one or more load balancer gears of the application. Once new information about the load balancer gear is received by the routing component, traffic may be routed to all of the load balancer gears of the application.

In some implementations, traffic may continue to be routed to any functioning load balancer gears regardless of whether one of the load balancer gears fails. In some implementations, the routing component is capable of detecting backend gears that have failed or are otherwise unavailable. Traffic is then reallocated by the load balancer gears and diverted to the remaining backend gears. Once the routing component determines that the unavailable backend gears are available once again, traffic is routed according to the previous allocation configuration. Method 500 of FIG. 5 below provides additional details from the perspective of the broker.

Figure 5:
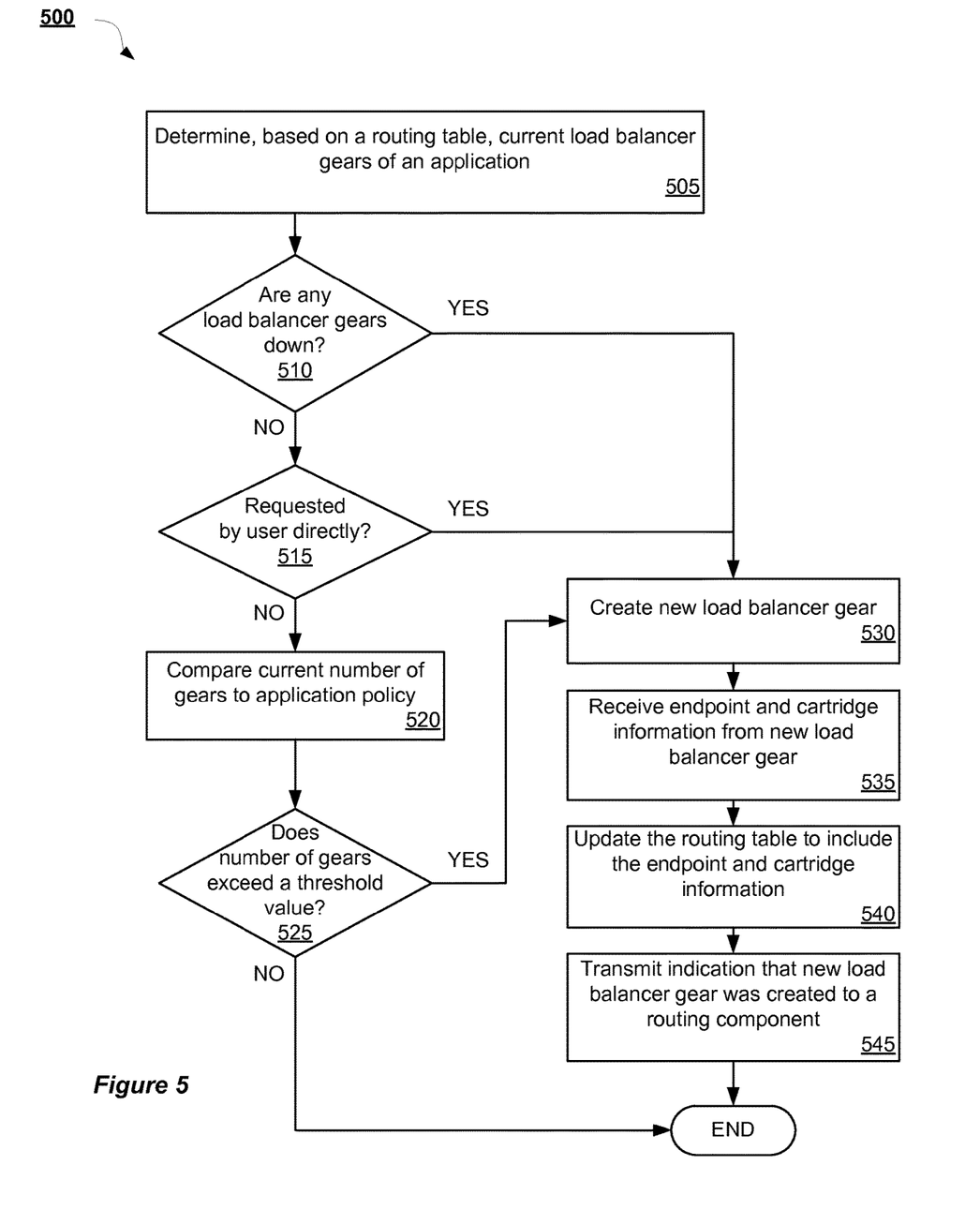
FIG. 5 is a flow diagram illustrating a method for creating a load balancer gear for an application in a multi-tenant PaaS system according to an implementation of the disclosure.

FIG. 5 is a flow diagram illustrating a method 500 for creating a load balancer gear for an application in a multi-tenant PaaS system according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by broker 222 described with respect to FIGS. 2 and 3. In other implementations, method 500 is performed by routing component 302 (e.g., when broker 222 acts as router 302).

Method 500 begins at block 505, where a broker (e.g., broker 222) of a multi-tenant PaaS system determines, based on a routing table (e.g., 250), the current load balancer gears corresponding to an application. The broker may periodically query the gears of the application to determine their statuses (e.g., whether or not they are available or unavailable). In certain implementations, a routing component (e.g., routing component 204) of a routing layer (e.g., routing layer 202) may query the gears of the application, and send notifications to the broker in response to determining that a gear is unavailable (i.e., the gear has failed or is unresponsive).

At block 510, the broker determines if any load balancer gears of the application are unavailable. If not, the method proceeds to block 515. In some implementations, an application policy may determine how to proceed from step 510. For example, the policy may stipulate that any time a load balancer gear is unavailable that a new load balancer gear should be created. In some implementations, once the original load balancer gear becomes available again, one of the load balancer gears is removed. The policy may alternatively stipulate that no new load balancer gears are to be created until a total number of load balancer gears falls below a threshold number. In some implementations, for example, when there are only two load balancer gears of the application, if one becomes unavailable, a new load balancer gear is created to maintain a minimum number of two load balancer gears for the application.

At block 515, the broker determines if a user (e.g., a user at client device 320) has requested that a new load balancer gear be created for the application. For example, the user may wish to increase the availability of the application manually, and submit a request to the broker. In certain implementations, the user may also request to have a load balancer gear removed from the application. If no request was received from the user, the method proceeds to block 520.

At block 520, the broker compares the current number of gears utilized by the application to a policy of the application (i.e., a threshold condition). For example, the policy may be user-defined or may be a standard policy associated with the multi-tenant PaaS system. The policy may be stored locally at the broker (e.g., as part of the routing table), or may be requested from a client device or from the routing component. At block 525, the broker determines if the number of gears of the application meet or exceed a threshold value stipulated by the policy. For example, the policy may stipulate that for every 10 gears utilized by the program, an additional load balancer gear is to be created. If it is determined that the threshold condition is not met, method 500 ends and may repeat continuously starting from, for example, block 505.

If any of the conditions of blocks 510, 515, or 525 are determined by the broker to be true, then the method 500 proceeds to block 530 in which a new load balancer gear is created. In some implementations, an available node is identified and a create operation is transmitted to the node from the broker. In other implementations, a pre-existing gear of the application may be converted into a load balancer gear, for example, by installing a load balancer cartridge (e.g., load balancer cartridge 364) on the gear. In some implementations, the broker identifies a node available to the application for which there is no load balancer gear running on the node. In such instances, the broker causes the load balancer gear to be created on the identified node to avoid placing multiple load balancer gears on a single node.

The method proceeds to block 535, where endpoint and cartridge information is received by the broker from the new load balancer gear. For example, in response to the broker initiating a create operation, the resulting load balancer gear transmits back to the broker information relating to the load balance gear's location, how the load balancer gear is being exposed to the application, and any application components that the load balancer gear is equipped with.

At block 540, the routing table of the broker (e.g., routing table 250) is updated to include the received endpoint and cartridge information. At block 545, the broker transmits an indication to the routing component indicating that a load balancer gear is newly created. The indication may include the endpoint and cartridge information. In some implementations, the indication notifies the routing component of a location of the new load balancer gear, and the routing component proceeds to retrieve relevant information directly from the new load balancer gear. Once the routing component is aware of the new load balancer gear, it begins routing traffic to the new load balancer gear in accordance with the implementations described herein.

Figure 6:
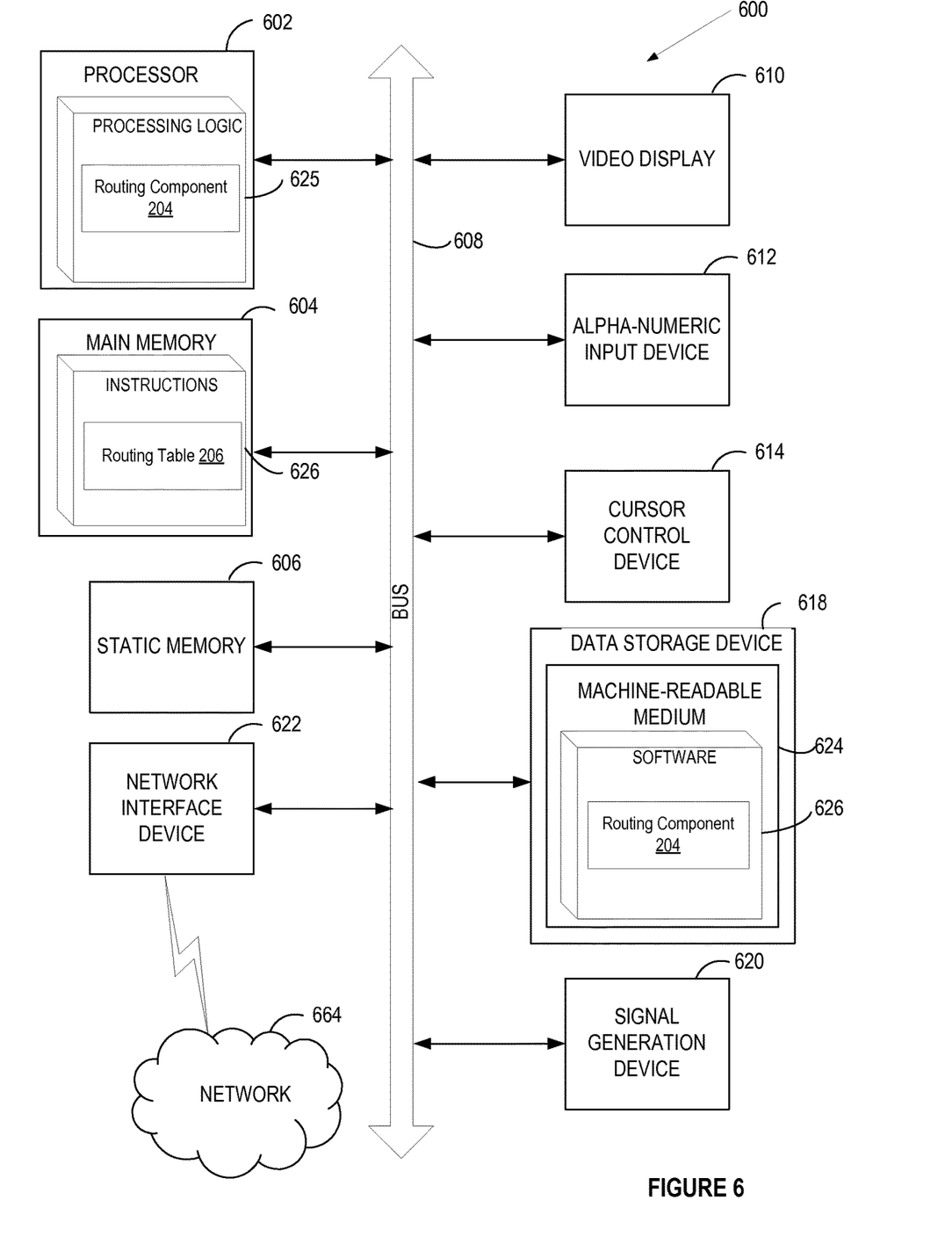
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 includes a processing device 602 (e.g., processor, CPU, etc.), a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to access data from routing table 206 to implement a routing tier to route of traffic for an application in a multi-tenant PaaS, which can be performed by routing component 204 as described with respect to FIGS. 2 and 3, and/or a software library containing methods that call the above applications. In certain implementations of computer system 600, as it would pertain to broker 222, routing table 206 would be replaced by routing table 250, and routing component 204 would be eliminated in favor of a suitable component relating to the function of broker 222. In other implementations of computer system 600, namely an implementation in which broker 222 performed the same functionality as routing component 204, routing table 206 may be synonymous with routing table 250. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", "translating", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
receiving information related to a load balancer gear of an application running on the multi-tenant Platform as a service (PaaS) system, wherein the information comprises endpoint information indicating a location of the load balancer gear, and cartridge information identifying one or more cartridges implemented on the load balancer gear;
updating, by a processing device, a routing table in view of the endpoint information and the cartridge information; and
causing traffic to be routed to the load balancer gear in view of the updated routing table regardless of whether a previously-utilized load balancer gear of the application is operational, the load balancer gear to direct the traffic to one or more other gears of the application.

2. The method of claim 1, further comprising:
causing additional traffic to be routed to the previously-utilized load balancer gear of the application, wherein the additional traffic was previously routed to the previously-utilized load balancer gear prior to receiving the information related to the load balancer gear.

3. The method of claim 1, further comprising causing the load balancer gear to route the traffic to a subset of a plurality of gears in view of the cartridge information.

4. The method of claim 1, wherein the endpoint information comprises one or more of an endpoint domain name service (DNS) entry of the load balancer gear, a port number, a hostname of a host server of the load balancer gear, a protocol used by the gear, or a location of one or more backend gears.

5. The method of claim 4, wherein the protocol used by the gear comprises one of Hypertext Transfer Protocol (HTTP), Hypertext Transfer Protocol Secure (HTTPS), Transmission Control Protocol (TCP), Git, Secure Shell (SSH), or a MySQL protocol.

6. The method of claim 1, wherein the load balancer gear and the previously utilized load balancer gear each reside on different nodes of the multi-tenant PaaS system.

7. A non-transitory machine-readable storage medium including instructions that, when accessed by a processing device, cause the processing device to:
receive information related to a load balancer gear of an application running on the multi-tenant Platform as a Service (PaaS) system, wherein the information comprises endpoint information indicating a location of the load balancer gear, and cartridge information identifying one or more cartridges implemented on the load balancer gear;
update, by the processing device, a routing table in view of the endpoint information and the cartridge information; and
cause traffic to be routed to the load balancer gear in view of the updated routing table regardless of whether a previously utilized load balancer gear of the application is operational, the load balancer gear to direct the traffic to one or more other gears of the application.

8. The non-transitory machine-readable storage medium of claim 7, including instructions that, when accessed by the processing device, cause the processing device further to:
cause additional traffic to be routed to the previously-utilized load balancer gear of the application, wherein the additional traffic was previously routed to the previously-utilized load balancer gear prior to receiving the information related to the load balancer gear.

9. The non-transitory machine-readable storage medium of claim 7, wherein the instructions further cause the load balancer gear to route traffic to a subset of a plurality of gears in view of the cartridge information.

10. The non-transitory machine-readable storage medium of claim 7, wherein the endpoint information comprises one or more of an endpoint domain name service (DNS) entry of the load balancer gear, a port number, a hostname of a host server of the load balancer gear, a protocol used by the gear, or a location of one or more backend gears.

* * * * *